(12) United States Patent
Pfister et al.

(10) Patent No.: US 11,566,970 B2
(45) Date of Patent: Jan. 31, 2023

(54) TEST STAND AND METHOD FOR CARRYING OUT A TEST

(71) Applicant: AVL LIST GMBH, Graz (AT)

(72) Inventors: Felix Pfister, Graz (AT); Wolfgang Winkler, Pischeldorf in der Steiermark (AT); Emre Kural, Graz (AT); Camillo Signor, Neunkirchen (AT); Gerald Hoehmann, Hitzendorf (AT)

(73) Assignee: AVL LIST GMBH, Graz (AT)

( * ) Notice: Subject to any disclaimer, the term of this patent is extended or adjusted under 35 U.S.C. 154(b) by 142 days.

(21) Appl. No.: 16/769,552

(22) PCT Filed: Dec. 3, 2018

(86) PCT No.: PCT/EP2018/083296
§ 371 (c)(1),
(2) Date: Jun. 3, 2020

(87) PCT Pub. No.: WO2019/110480
PCT Pub. Date: Jun. 13, 2019

(65) Prior Publication Data
US 2020/0348209 A1 Nov. 5, 2020

(30) Foreign Application Priority Data

Dec. 4, 2017 (AT) .............................. A 50999/2017

(51) Int. Cl.
*G01M 17/007* (2006.01)
*G01M 15/04* (2006.01)
(Continued)

(52) U.S. Cl.
CPC .......... *G01M 15/102* (2013.01); *G01M 15/04* (2013.01); *G01M 17/007* (2013.01); *G09B 9/042* (2013.01); *G09B 19/167* (2013.01)

(58) Field of Classification Search
CPC .. G01M 15/102; G01M 17/007; G01M 15/04; G01M 15/02; G01M 15/042;
(Continued)

(56) References Cited

U.S. PATENT DOCUMENTS 5,193,062 A * 3/1993 Murase ............. G01M 17/0072
701/70
2017/0050590 A1  2/2017 List et al.
2017/0050644 A1  2/2017 List et al.

OTHER PUBLICATIONS

Giadoumis (Driving and Engine Cycles, 2017, p. 23-24; "Giadoumis") (Year: 2017).*

* cited by examiner

*Primary Examiner* — Eric S. McCall
*Assistant Examiner* — Timothy P Graves
(74) *Attorney, Agent, or Firm* — Dykema Gossett PLLC

(57) ABSTRACT

Various embodiments of the present disclosure are directed to test stands for generating test runs on the basis of a test drive using a vehicle along a driving route. In some embodiments, a test stand determines at least one idle operating time of an internal combustion engine and/or at least one overrun operating time of the internal combustion engine from a time curve of a vehicle speed and a time curve of a gas pedal position. The test stand may further set a specified idle control mode instead of the operating control mode during an idle operating time and/or a specified overrun control mode is set instead of the operating control mode during an overrun operating time in the test stand automation unit in order to carry out the test run.

6 Claims, 4 Drawing Sheets

(51) Int. Cl.
*G01M 15/10* (2006.01)
*G09B 9/042* (2006.01)
*G09B 19/16* (2006.01)

(58) Field of Classification Search
CPC ............. G01M 17/00; G01M 17/0072; G01M 17/0074; G09B 9/042; G09B 19/167; G06F 11/3672
See application file for complete search history.

TEST STAND AND METHOD FOR CARRYING OUT A TEST

CROSS-REFERENCE TO RELATED APPLICATIONS

This application is a national stage filing based upon International PCT Application No. PCT/EP2018/083296, filed 3 Dec. 2018, which claims the benefit of priority to Austria application No. A 50999/2017, filed 4 Dec. 2017.

BACKGROUND

The present invention relates to a method for carrying out a test run on a test stand to simulate a test drive of a vehicle along a driving route, whereas an internal combustion engine being connected to a dynamometer on the test stand in order to carry out the test run, and both the internal combustion engine and the dynamometer being controlled by a test stand automation unit according to a set operating control mode by specifying setpoint values of the test run for the internal combustion engine and for the dynamometer. The invention further relates to a corresponding test stand.

In the development of internal combustion engines, drive trains having internal combustion engines and vehicles having internal combustion engines, checking the emission and consumption behavior of the internal combustion engine plays a central role. In all phases of development, the emission and consumption behavior of the internal combustion engine is checked on test stands, such as an engine test stand, drive-train test stand or roller test stand. However, the legal framework for this checking are currently changing significantly. Whilst previously mainly standardized driving cycles, such as the New European Driving Cycle (NEDC), were used for this checking, checking under real driving conditions is now also required. For the emission behavior, Real Driving Emissions (RDE) tests are used, in which no specific driving cycle is specified, but a more or less random driving route is covered, which only has to correspond to certain defined conditions.

For the development of internal combustion engines, drive trains or vehicles on the test stand, it is therefore also desirable to carry out the checking on the test stand using real tests of this kind.

It is therefore necessary to record measured values of the test drive, such as GPS data, engine speed, gas pedal position, vehicle speed, etc., from real test drives using a vehicle on a real road. A test run for a test stand that is representative of the test drive then also has to be created from the recorded measured values, and can then be run through in whole or in part on the test stand, for example in order to record and evaluate the emission or consumption behavior of the internal combustion engine. Examples of this can be found in DE 10 2012 018 359 A1 or WO 2015/166069 A2.

The internal combustion engine is operated on the test stand according to the specifications of the test run, either alone (engine test stand) or in combination with other components (drive-train test stand, roller test stand). To carry out the test, the internal combustion engine on the test stand is connected, directly or indirectly, to a dynamometer, and the dynamometer and the internal combustion engine are controlled by a test stand automation unit according to the specifications of the test run. For example, the dynamometer can be connected directly to an internal combustion engine by means of a test stand shaft. To a drive train, for example indirectly by means of a driven wheel hub of a half-axle of the drive train, whereas on a drive train test stand a dynamometer is usually connected on both sides to the driven wheel hubs. On a roller test stand the dynamometer drives a roller on which a wheel of the vehicle rolls. This means that the dynamometer is also connected indirectly (by means of the roller) to the internal combustion engine on a roller test stand. The speed of the internal combustion engine (or of the drive train) is generally set by means of the dynamometer by the dynamometer generating a loading torque for the internal combustion engine. An engine torque is generally set using the internal combustion engine. For this purpose, gas pedal positions are usually specified for the engine control unit, which the engine control unit converts into engine control signals (injection amount, injection timing, EGR (exhaust gas recirculation) setting, ignition timing, etc.). As a test run, setpoint values for the engine speed and the engine torque or an equivalent variable, such as a gas pedal position, a drive train speed, etc., are therefore required in order to be able to carry out the test run on the test stand. These setpoint values, which are actually a time curve (also in the form of a discrete-time curve) of the setpoint values, have to be generated from the real test drive.

Various control modes can also be implemented on the test stand or in the test stand automation unit in order to carry out the test run. If the gas pedal position is specified directly as the setpoint value, reference is usually made to $N/\alpha$ control (N for the speed and a for the gas pedal position). If, on the other hand, torques are specified, reference is usually made to N/T control (N for the speed and T for the torque). In this control mode, an actual torque of the internal combustion engine also has to be recorded in order to determine a gas pedal position from the deviation of the actual torque from the specified torque, which position is required to compensate for the deviation and which in turn can then be specified for the engine control unit (ECU). For this purpose, a suitable controller is generally also implemented in the test stand automation unit, which controller carries out this process. In addition, other setpoint values that are suitable for carrying out a test run can also be specified. Other setpoint values of this kind are preferably variables that are equivalent to a torque or a gas pedal position, or from which a torque or a gas pedal position can be derived. Examples of this are the injection amount or the cylinder mean effective pressure, and the ECU engine torque. In this case, reference is usually made to N/x control (N for the speed and x for the other controlled variable). In the same way, there can also be T/N, T/$\alpha$ or T/x control on the test stand, whereas the torque is set using the dynamometer. The control mode to be used is specified or selected by the test stand driver in order to carry out the test run on the test stand.

Since test stand times are expensive, the test stand capacity is usually limited and since test stand tests are complex, it is a general goal to simplify carrying out the test runs.

SUMMARY OF THE INVENTION

Nevertheless, test runs having high informative value, for example with regard to legal requirements or framework, should be carried out. It is therefore an object of the present invention to achieve this goal using a test stand and a method for carrying out a test run to simulate a test drive of a vehicle along a driving route.

This object is achieved by the invention in that at least one idle operating time of the internal combustion engine and/or at least one overrun operating time of the internal combustion engine is determined from a time curve of the vehicle speed and a time curve of the gas pedal position, and in that, in the test stand automation unit, in order to carry out the test run, a specified idle control mode is set instead of the operating control mode during an idle operating time, and/or a specified overrun operating control mode is set instead of the operating control mode during an overrun operating time. A more realistic test result during an idle operating time and/or an overrun operating time can thus be achieved in a simple manner on the test stand by means of a test run, by means of which in particular the emission behavior or the consumption of the internal combustion engine during operating times of this kind can be simulated more realistically on the test stand.

During an idle operating time, the idle control mode is preferably set, in which a torque of zero is specified as the setpoint value for the dynamometer and a gas pedal position of zero is specified as the setpoint value for the internal combustion engine.

During an overrun operating time, $N/\alpha$ control is preferably set as the overrun control mode because this can ensure that the engine control unit of the internal combustion engine alone controls the torque of the internal combustion engine.

Carrying out the test in a simple and automated manner is made possible if an idle operating time is sought as a time range from measured values of the test drive, in which time range both the vehicle speed and the gas pedal position are zero in the time curve of the vehicle speed and in the time curve of the gas pedal position. An idle speed of the internal combustion engine can also simply be determined as the engine speed during the idle operating time. A distinction can also be made between a cold and a warm idle speed.

Additional idle operating times can easily be found as time ranges during which the engine speed corresponds to the idle speed.

Carrying out the test in a simple and automated manner is made possible if an overrun operating time is sought as a time range from the measured values of the test drive, in which time range the gas pedal position is zero and the engine speed is greater than a specified idle speed in the time curve of the engine speed and of the gas pedal position.

BRIEF DESCRIPTION OF THE DRAWINGS

The present invention is described in greater detail in the following with reference to FIGS. 1 to 7, which show advantageous embodiments of the invention by way of example, schematically and in a non-limiting manner. In the drawings.

DETAILED DESCRIPTION

Figure 1:
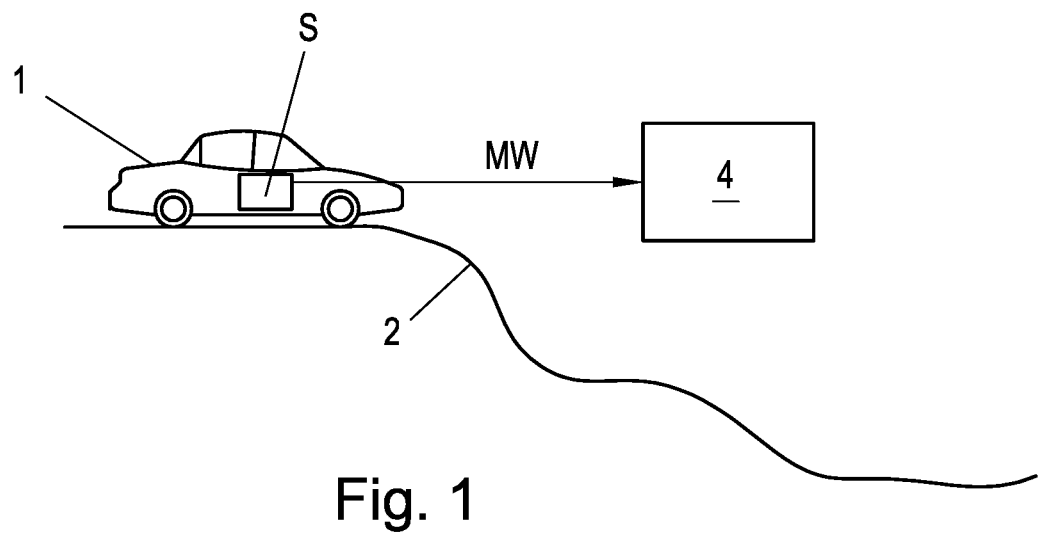
FIG. 1 shows a test drive using a vehicle along a driving route.
Figure 2:
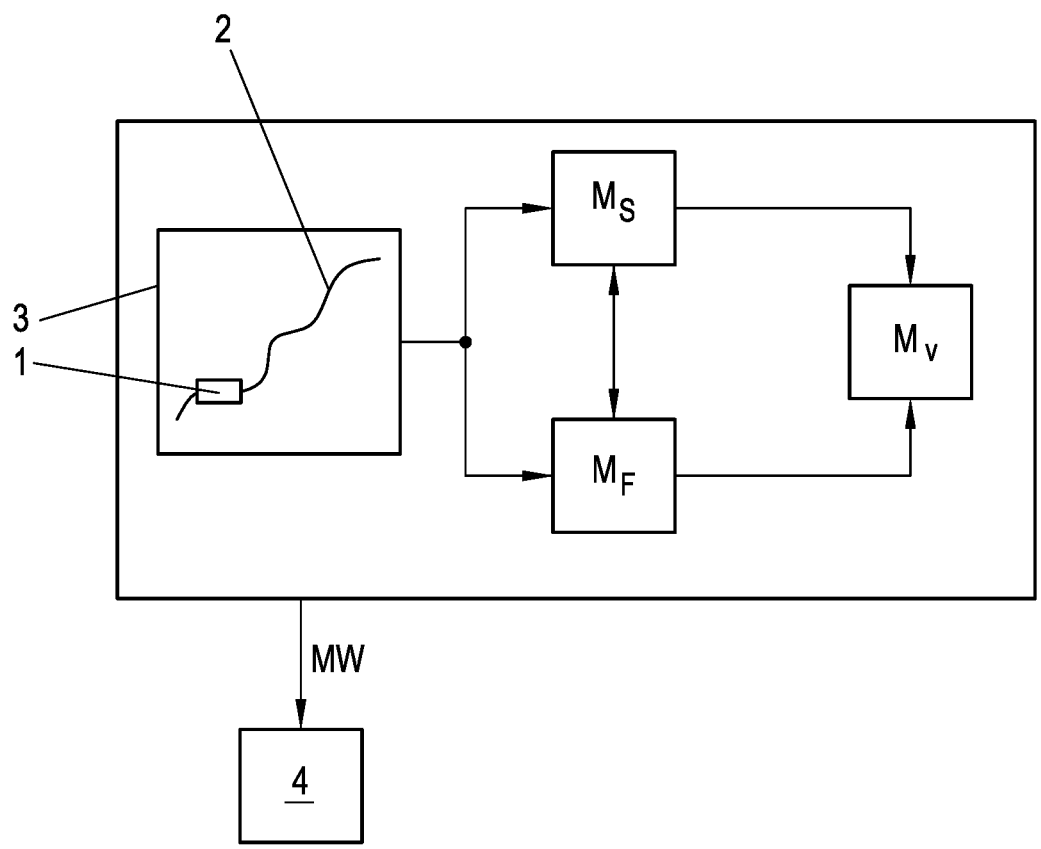
FIG. 2 shows the simulation of a test drive using a vehicle along a driving route.

The starting point for the invention is a test drive using a vehicle 1 along a specified driving route 2 (FIG. 1). A real vehicle 1 can be moved by a driver on a real road (also a route on a test site). However, it is also conceivable that the test drive along the road is simulated (FIG. 2) or that a test drive using a vehicle 1 is carried out on a roller test stand. The simulation takes place, for example, on suitable hardware (computer) using suitable software. For the simulation, a driving route 2 could be selected in a digital map 3, for example, and driving of a vehicle 1 along this driving route 2 could be simulated. This can be achieved, for example, in a well known manner by combining a road model Ms, which reproduces the road conditions (sea level, gradient, curve radius, road surface, etc.), a driver model $M_E$, which reproduces the characteristics of a driver (switching behavior, driving behavior, etc.), and a vehicle model $M_V$, which reproduces the dynamics of the vehicle. Of course, further models can also be implemented and integrated into the simulation, such as a tire model. Events such as traffic signs, traffic lights, other road users, road traffic, etc. can also be taken into account in simulations of this kind. The necessary simulation models are known and available, and therefore there is no need to describe them in more detail here. For carrying out the test drive on a roller test stand a desired test drive is specified.

If a test drive using a vehicle is subsequently mentioned, then a real drive using a real vehicle 1 on a driving route 2 on a real road is expressly included, as well as a simulated drive using a virtual vehicle 1 along a virtual driving route 2, as well as a test drive on a roller test stand.

Measured values MW are recorded during the test drive. The measured values MW thus represent the test drive using the vehicle 1 along a driving route 2. This can be achieved by means of corresponding sensors S, in particular sensors that are anyway present in a vehicle 1. For example, the measured values MW of vehicle sensors S of this kind can be read out directly by means of the on-board diagnostic (OBD) interface. However, the vehicle 1 can of course also be equipped with non-standard vehicle sensors for the test drive in order to record further measured values MW, for example emission values (NOx, HC (CO, $CO_2$, etc.)). In the simulation, any simulation variables can be used as "measured values" MW of the various implemented simulation models. For this purpose, additional simulation models can also be implemented in order to simulate a specific variable, for example an emission model for simulating the emission values.

It is also possible to determine additional measured values MW from other recorded measured values MW. This can take place during the test drive or after the test drive as well. An example of this is the torque of the internal combustion engine or gear information having gear shift timings, possibly also clutch timings, which often cannot be measured or cannot be measured easily during a real test drive. The torque can be obtained, for example, from known characteristic diagrams (for example a characteristic diagram for speed, gas pedal position, torque) or can also be calculated from models or physical relationships. For example, the torque could be calculated from a road gradient, the vehicle mass and a resistance factor (rolling resistance, air resistance) and the vehicle dynamics (speed, acceleration). The engine power could be determined from the vehicle speed and a vehicle resistance force (from the gradient of the road, rolling resistance, air resistance, etc.), from which engine power the torque can then be calculated using the speed. It is obvious that there are numerous options for determining variables that are not directly measured. The gear information can be obtained, for example, from other measured values MW, for example engine speed and vehicle speed.

However, the measured values MW can also simply be available, for example from test drives or simulations carried out previously, or also in the form of measured values which are created in any way and which describe a test drive using a vehicle 1 along a driving route 2.

If measured values MW are subsequently mentioned, then directly measured variables are included as well as variables from a simulation, as well as variables that are calculated from other known variables (measured or simulated), as well as other available measured values.

In order to implement the method according to the invention, the time curves (or equivalent path-based curves) of at least the vehicle speed v, the gas pedal position $\alpha$ and the engine speed N of the vehicle 1 of the test drive are required, which are either specified as measured values MW or obtained as measured values MW as described above. Of course, equivalent variables could also be used for this purpose, for example any speed of a drive train as the engine speed N. If a time curve is mentioned, then this of course includes continuous-time curves as well as discrete-time curves.

The aim of the test run on the test stand 10 is to simulate the test drive on the test stand 10 as realistically as possible. During a test drive, however, the vehicle 1 is generally subjected to various operating states. In a holding phase of the vehicle 1, the internal combustion engine is idle. In this state, the vehicle speed is zero and the gas pedal is not actuated. This operation is usually controlled in a real vehicle 1 by a separate idle mode of the engine control unit ECU. In the overrun operation, the gas pedal is not actuated and the internal combustion engine has a braking effect (engine brake), i.e. the internal combustion engine generates a negative torque. These operating states often generate particularly high emissions or consumption values, which are of course particularly of interest for the test run considering the increasing legal requirements. The test run on the test stand 10 using a unit under test having an internal combustion engine 11, for example a vehicle or a vehicle component (internal combustion engine, drive train), should therefore in particular also reproduce these operating states in order to be able to achieve very realistic results by means of the test run.

In order to make this possible, the measured values MW recorded during the test drive are first analyzed in an evaluation unit 4 in order to identify an idle state and/or an overrun operation during the test drive. This is explained with reference to FIG. 3.

Figure 3:
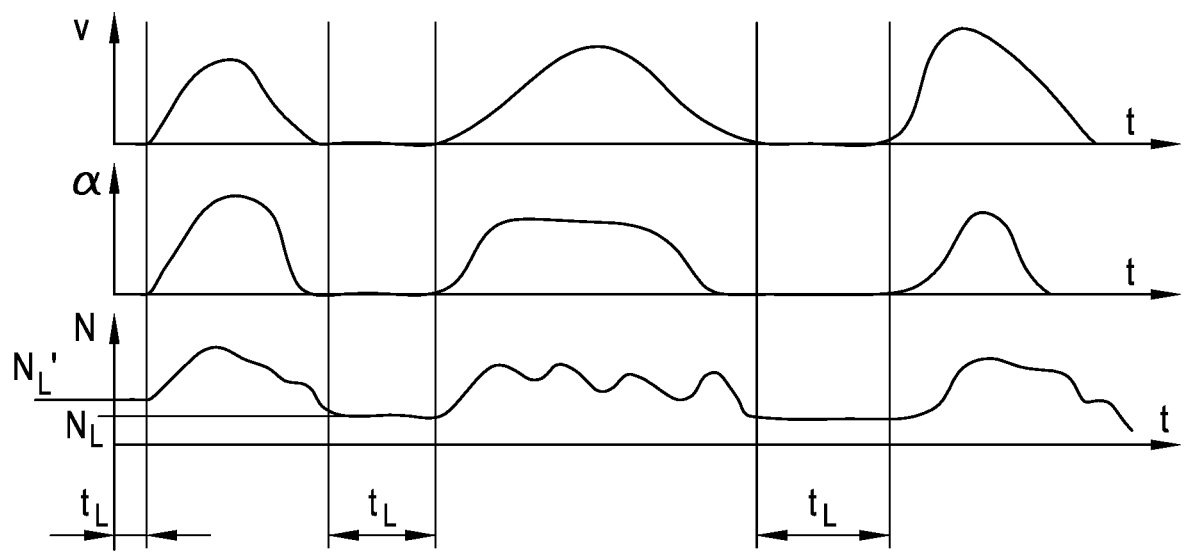
FIG. 3 shows the determination of an idle operating time of the internal combustion engine.

FIG. 3 shows the time curves of the vehicle speed v, the gas pedal position $\alpha$ and the engine speed N, which are available as measured values MW. In order to detect the idle phases during the test drive, i.e. in the measured values MW, the time curves of the vehicle speed v and of the gas pedal position $\alpha$ are examined in order to find time ranges in which the gas pedal position $\alpha$ is zero and the vehicle speed v is zero. For practical implementation, a window is preferably specified around zero, for example a vehicle speed v<0.5 m/s is understood as "zero". Of course, a window is selected that is so narrow that, taking into account fluctuations in measured values and inaccuracies, only the time ranges describing the relevant state are recorded. If both conditions apply, an idle operation can be assumed. All idle operating times $t_L$ during the test drive can thus be determined.

An engine speed N can also be determined in an idle operating time $t_L$, preferably as an average over the idle operating time $t_L$, in order to determine an idle speed $N_L$. A distinction can also be made between a warm idle speed $N_L$ and a cold idle speed $N_L'$. If the idle speed $N_L$, $N_L'$ has been determined, then all time ranges of the engine speed N with these speeds can be identified as idle operating times $t_L$ (possibly again in a specified window around this speed). All time ranges $t_L$ with idle operation can thus likewise be determined in the test drive.

Figure 4:
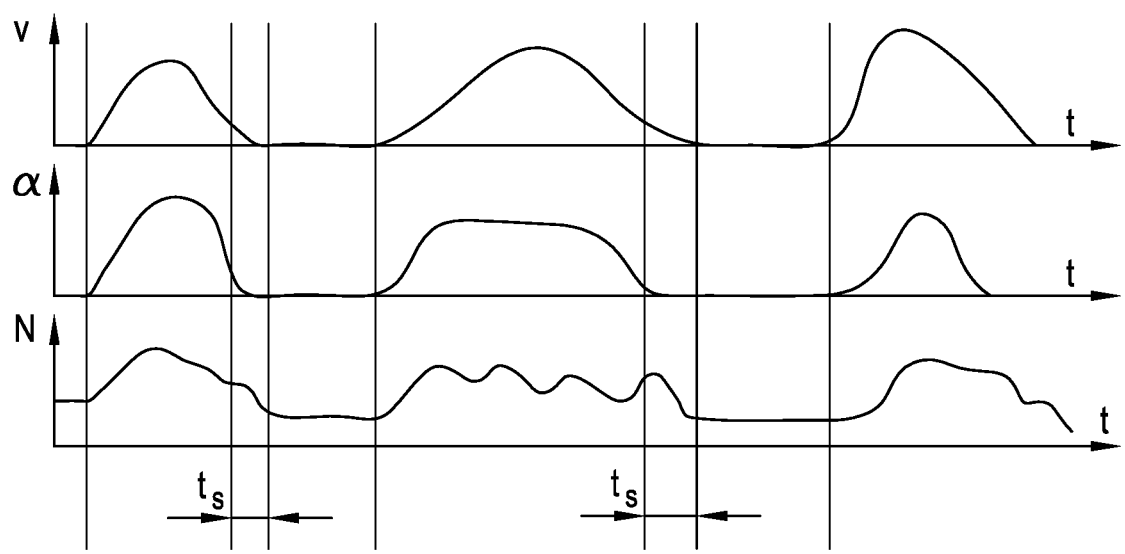
FIG. 4 shows the determination of an overrun operating time of the internal combustion engine.

The determination of the overrun operating times is with overrun operation is based on the knowledge of the idle speed $N_L$, possibly for warm and cold idle speeds, of the internal combustion engine. The idle speed $N_L$ is either a known parameter of the internal combustion engine or, as described above, can be determined from the measured values MW of a test drive. The overrun operating times $t_S$ can thus be identified, in which the gas pedal position $\alpha$ is zero (possibly again in a window around zero), or is approximately zero, and the engine speed N is greater than the idle speed $N_L$. This is shown in FIG. 4.

It is particularly advantageous to first determine the idle speed $N_L$ (possibly for warm and cold idle speeds) as described above and from this to derive the idle operating times $t_L$ with idle state and the overrun operating times $t_S$ with overrun operation. This allows fully automated processing of the measured values MW in the evaluation unit 4.

Of course, it is also possible to identify only the idle operating times $t_L$ or the overrun operating times $t_S$ for the test run.

Figure 5:
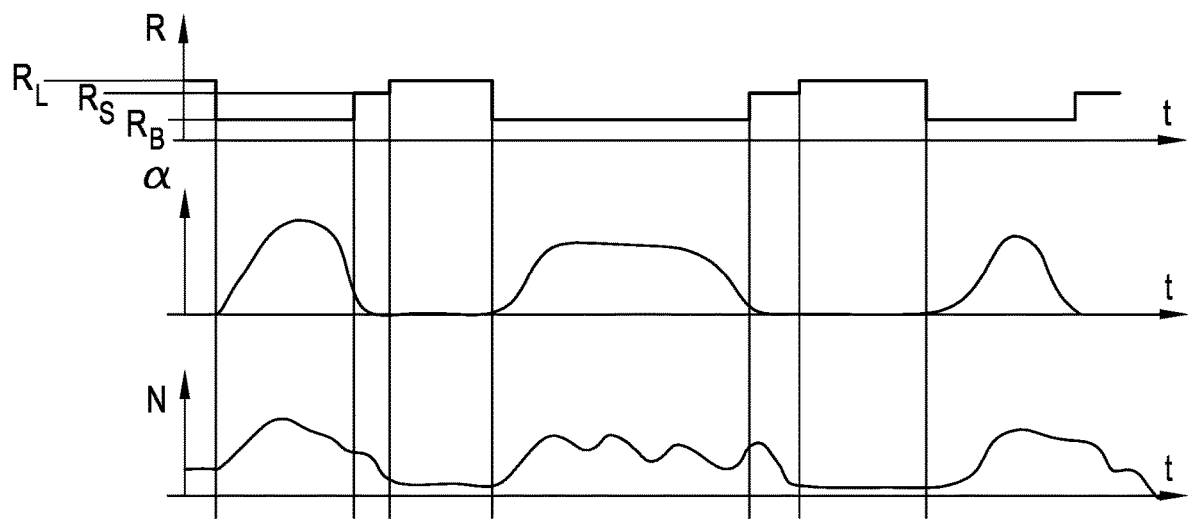
FIG. 5 shows various control modes of the test stand automation unit while the test run is being carried out.

To carry out the test run on the test stand 10, the control mode R on the test stand 10 is changed on the basis of the identified overrun operating times $t_S$ for the overrun operation and/or idle operating times $t_L$ for the idle state, as will be explained with reference to FIG. 5.

A separate idle control mode $R_L$ is implemented in the test stand automation unit 13 for the idle operation. In this control mode $R_L$, a torque of zero is specified as the setpoint value for the dynamometer 12. The setpoint value for the gas pedal position $\alpha$ is likewise zero. This results in a free idle speed on test stand 10.

For the overrun operation, it is important for carrying out the test run on the test stand 10 that the engine control unit ECU alone controls the torque T of the internal combustion engine and that the test stand automation unit 13 does not interfere in the control of the engine control unit ECU. For this reason, N/$\alpha$ control is set as the overrun operating control mode $R_S$ in the test stand automation unit 13, in which N/$\alpha$ control the gas pedal position $\alpha$=zero is transferred to the engine control unit ECU as the manipulated variable $ST_V$. It can thus be ensured on test stand 10 that the consumption value and emission values of the test drive in the overrun operation are simulated in a realistic and best possible way.

At times when there is no idle operation or overrun operation, any control mode R can be configured in the test stand automation unit 13, for example N/T control, N/x control, N/$\alpha$ control, or T/n, T/$\alpha$ or T/x control.

The setpoint values SW according to the set control mode R are required for carrying out the test run. These setpoint values SW are obtained from the test drive, as described above. For this purpose, specific measured values MW of the test drive can be used as the setpoint values SW, for example the gas pedal position $\alpha$ or the engine speed N. Setpoint values SW can also be obtained from measured values MW, as likewise described above, for example the torque T or gear information.

On the test stand 10, the internal combustion engine 11 is connected to a dynamometer 12, for example by means of a test stand shaft 14. The test stand automation unit 13 controls both the internal combustion engine 11 and the dynamometer 12 according to the requirements of the test run in the form of specific setpoint values SW for a variable to be controlled and the control mode R. From the specified setpoint values SW, the test stand automation unit 13 determines the manipulated variables, by means of which the internal combustion engine 11 and the dynamometer 12 are controlled. In the case of the dynamometer 12, the manipulated variable $ST_B$ is, for example, a speed (in particular in N/T control, N/x control or N/α control) by means of which the engine speed N of the internal combustion engine 11 is set. For this purpose, a corresponding speed controller $R_N$ can also be implemented in the test stand automation unit 13, which speed controller can also obtain an actual value of the speed $N_{ist}$, which is recorded, for example, by means of a speed sensor 15 on the dynamometer 12. The internal combustion engine 11 is controlled on the basis of a suitable manipulated variable $ST_P$, for example a gas pedal position α, as described at the outset.

To carry out the test run, the test stand automation unit 13 obtains the corresponding time curves (also in the form of discrete-time curves) of the setpoint values SW, for example from the evaluation unit 4. It is also irrelevant whether the entire time curve is transferred in order to carry out the test run or whether in each time step of the control the setpoint value SW to be adjusted is transferred in each case. Likewise, the control mode R is specified for the test stand automation unit 13, for example by the evaluation unit 4. In order to carry out the test run on the test stand 10, a desired operating control mode $R_B$ can be configured in the test stand automation unit 13, for example by the test stand driver. This operating control mode $R_B$ can be changed temporarily by specifying the control mode R for implementing the idle operation and/or the overrun operation, as shown in FIG. 5. The control mode R is changed, in the idle state, to the specified idle control mode $R_L$ and is changed, in the overrun operation, to the specified overrun control mode $R_S$ (N/α control). Otherwise, the desired and configured operating control mode $R_B$ is used, for example an N/T, N/α or N/x control mode, or T/n, T/α or T/x control mode.

Figure 6:
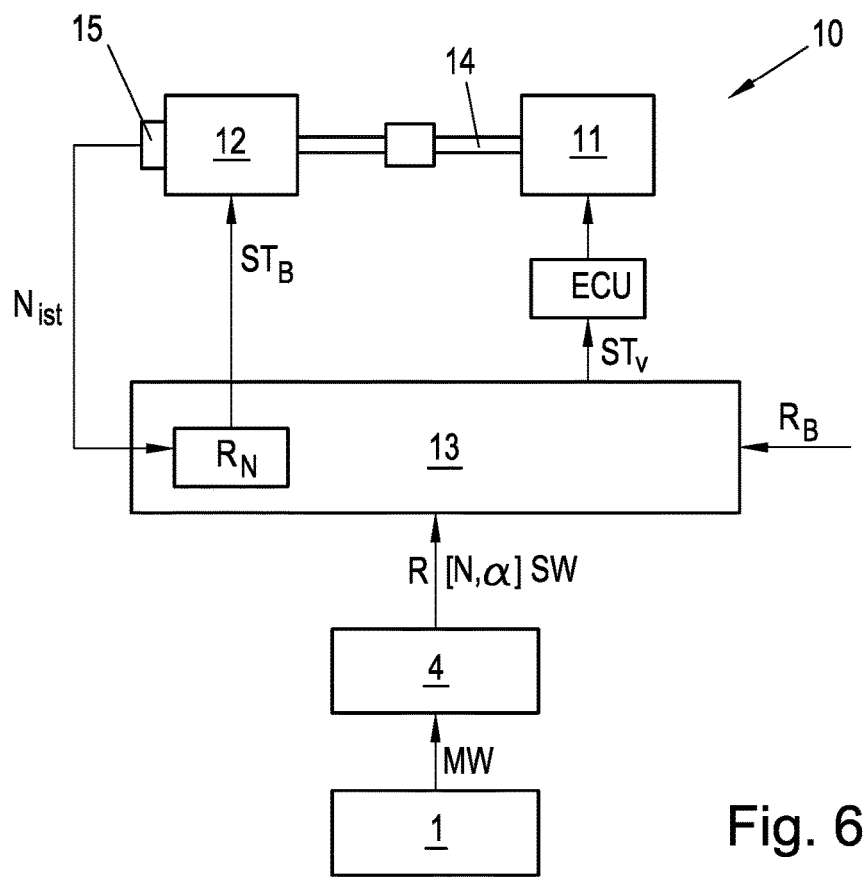
FIG. 6 shows $N/\alpha$ control on the test stand.

N/α control is shown in FIG. 6. For this purpose, the test stand automation unit 13 obtains the engine speed N and a gas pedal position α (actually time curves thereof) as setpoint values SW. The gas pedal position α can be transferred from the test stand automation unit 13 to the engine control unit ECU as a manipulated variable $ST_P$.

Figure 7:
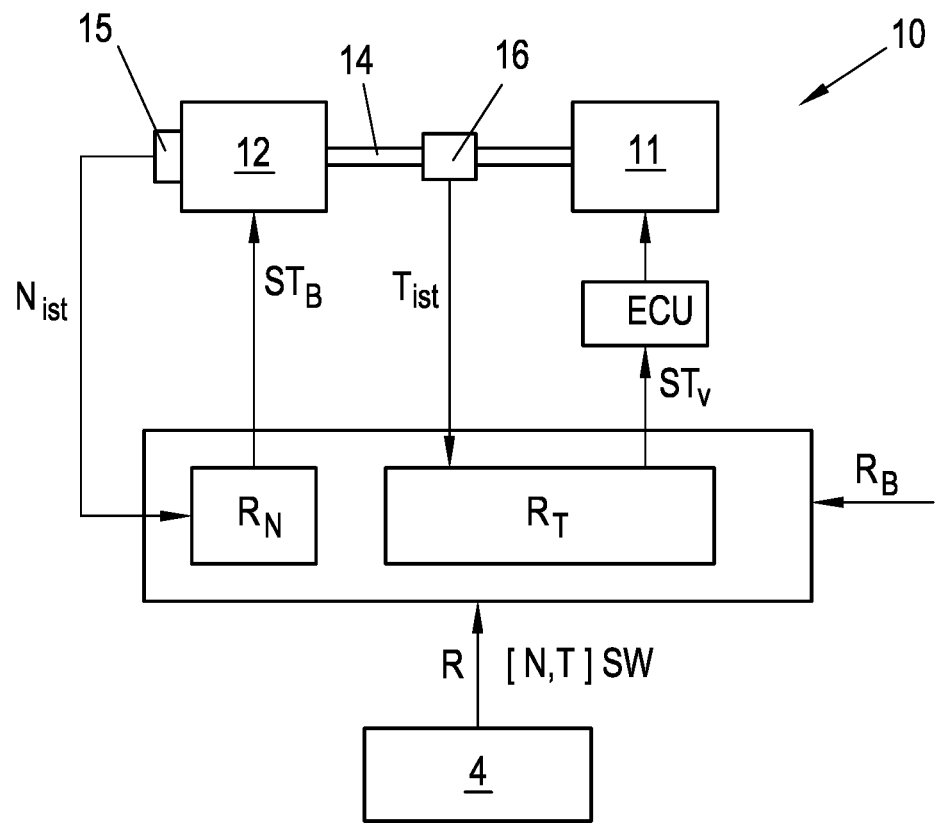
FIG. 7 shows N/T control on the test stand.

For N/T control (FIG. 7), a time curve of the torque T and a time curve of the engine speed N are transferred to the test stand automation unit 13 as setpoint values SW in order to carry out a test run, for example by the evaluation unit 4. For example, in the test stand automation unit 13, a torque controller $R_T$ is implemented which determines a gas pedal position α from an actual value of the torque $T_{ist}$, which e.g. can be measured by means of a torque sensor 16 on the test stand shaft 14 or can also be estimated from other measured variables (observer), and from the specified target value SW, which gas pedal position is transferred to the engine control unit ECU in order to control the internal combustion engine 11. The speed controller $R_N$ for controlling the dynamometer 12 is also indicated in FIG. 7.

Of course, the evaluation unit 4 can always determine both the time curve of a gas pedal position α and the time curve of the torque T of the internal combustion engine 11 and transfer said time curves to the test stand automation unit 13 together with the engine speed N and the control mode R. The evaluation unit 4 could also be implemented in the test stand automation unit 13 as hardware and/or software.

The invention claimed is:

1. A method for carrying out a test run on a test stand to simulate a test drive of a vehicle along a driving route, the method including the following steps:
   providing a dynamometer on the test stand;
   providing an internal combustion engine connected to the dynamometer in order to carr' out the test run;
   controlling both the internal combustion engine and the dynamometer by a test stand automation unit according to a set operating control mode by specifying setpoint values of the test run for the internal combustion engine and for the dynamometer,
   determining at least one idle operating time ($t_L$,) of the internal combustion engine from a time curve of a vehicle speed and a time curve of a gas pedal position, wherein the at least one idle operating time is identified in the time curve of the vehicle speed and in the time curve of the gas pedal position when the vehicle speed and the gas pedal position are both zero and/or
   determining at least one overrun operating time of the internal combustion engine from a time curve of an engine speed and the time curve of the gas pedal position, wherein the at least one overrun operating time is identified in the time curve of the engine speed and the time curve of the gas pedal position when the gas pedal position is zero and the engine speed is greater than a specified idle speed, and
   setting a specified idle control mode in the test stand automation unit instead of the operating control mode during an idle operating time and controlling both the internal combustion engine and the dynamometer by the test stand automation unit during the idle operating time by specifying a torque of zero as setpoint value for the dynamometer and a gas pedal position of zero as setpoint value for the internal combustion engine, and/or setting a N/α-control as overrun control mode instead of the operating control mode during an overrun operating time and controlling both the internal combustion engine and the dynamometer by the test stand automation unit during the overrun operating time by specifying a speed as setpoint value for the dynamometer and a gas pedal position of zero as setpoint value for the internal combustion engine.

2. The method according to claim 1, further including the step of setting an N/T, N/α, N/x, T/n, T/α, or T/x fix control as the operating control mode.

3. The method according to claim 1, further including the step of determining an idle speed of the internal combustion engine as the engine speed during the idle operating time.

4. The method according to claim 3, characterized in that a time range is sought as at least one further idle operating time in a time curve of an engine speed, during which time range the engine speed corresponds to the idle speed.

5. Test stand for carrying out a test run to simulate a test drive of a vehicle along a driving route, the test stand comprising:
   an internal combustion engine;
   a dynamometer connected to the internal combustion engine; and
   a test stand automation unit configured and arranged to control both the internal combustion engine and the dynamometer according to a set operating control mode by specifying setpoint values of the test run for the internal combustion engine and for the dynamometer;
   an evaluation unit configured and arranged to determine at least one idle operating time of the internal combustion engine from a time curve of the vehicle speed and a time curve of the gas pedal position, wherein the at least one idle operating time is identified in the time curve of the vehicle speed and in the time curve of the gas pedal position when the vehicle speed and the gas pedal position are both zero and/or at least one overrun operating time ($t_s$) of the internal combustion engine (11) from a time curve of an engine speed (N) and a time curve of a gas pedal position ($\alpha$), wherein the at least one overrun operating time is identified in the time curve of the engine speed and the time curve of the gas pedal position when the gas pedal position is zero and the engine speed is greater than a specified idle speed; and wherein the test stand automation unit is further configured and arranged to carry out the test run using an idle control mode, instead of the operating control mode, during an idle operating time and controlling both the internal combustion engine and the dynamometer by the test stand automation unit during the idle operating time by specifying a torque of zero as setpoint value for the dynamometer and a gas pedal position of zero as setpoint value for the internal combustion engine, and/or setting N/$\alpha$-control as an overrun control mode and carrying out the test run using the overrun operating control mode instead of the operating control mode during an overrun operating time and controlling both the internal combustion engine and the dynamometer by the test stand automation unit during the overrun operating time by specifying a speed as setpoint value for the dynamometer and a gas pedal position of zero as setpoint value for the internal combustion engine.

6. The test stand of claim 5, wherein the test stand automation unit is further configured and arranged to set an N/T, N/$\alpha$, N/x, T/n, T/$\alpha$ or T/x control as the operating control mode.

* * * * *